United States Patent
Munevar

(10) Patent No.: US 11,022,042 B2
(45) Date of Patent: Jun. 1, 2021

(54) AIRCRAFT HAVING A GAS TURBINE GENERATOR WITH POWER ASSIST

(71) Applicant: Rolls-Royce North American Technologies, Inc., Indianapolis, IN (US)

(72) Inventor: Erik A. Munevar, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1196 days.

(21) Appl. No.: 15/250,415

(22) Filed: Aug. 29, 2016

(65) Prior Publication Data

US 2018/0058330 A1 Mar. 1, 2018

(51) Int. Cl.
*F02C 6/14* (2006.01)
*F02C 7/275* (2006.01)
*F02C 7/36* (2006.01)
*F02C 7/32* (2006.01)

(52) U.S. Cl.
CPC .............. *F02C 7/275* (2013.01); *F02C 6/14* (2013.01); *F02C 7/32* (2013.01); *F02C 7/36* (2013.01)

(58) Field of Classification Search
CPC .. F02C 7/275; F02C 7/268; F02C 7/26; F02C 7/36; F02C 7/32; F02C 6/14; F02K 3/06; Y02E 60/16; F02N 11/0862; F05D 2220/76; F05D 2260/42; F05D 2260/43; H02K 7/1823

See application file for complete search history.

(56) References Cited

U.S. PATENT DOCUMENTS

| 2,803,943 A | 8/1957 | Sinclair Rainbow Horace et al. |
| 3,720,060 A | 3/1973 | Davies et al. |
| 3,807,815 A | 4/1974 | Kasabian |
| 4,497,171 A | 2/1985 | Corrigan et al. |
| 4,804,288 A | 2/1989 | Tiernan, Jr. |
| 5,005,353 A | 4/1991 | Acton et al. |
| 5,182,960 A | 2/1993 | Chary |
| 5,309,029 A | 5/1994 | Gregory et al. |
| 5,689,141 A | 11/1997 | Kikkawa et al. |
| 5,694,765 A | 12/1997 | Hield et al. |
| 5,814,912 A | 9/1998 | Ross |
| 5,867,979 A | 2/1999 | Newton et al. |
| 6,064,123 A | 5/2000 | Gislason et al. |
| 6,729,140 B2 | 5/2004 | Care et al. |
| 6,851,267 B2 | 2/2005 | Bruno et al. |

(Continued)

FOREIGN PATENT DOCUMENTS

| DE | 102010014968 A1 | 10/2011 |
| DE | 10 2013 209538 A1 | 11/2014 |

(Continued)

OTHER PUBLICATIONS

Extended European Search Report, European Application No. 17184500.1-1007, dated Jan. 22, 2018, 7 pages.

(Continued)

*Primary Examiner* — William H Rodriguez
(74) *Attorney, Agent, or Firm* — Barnes & Thornburg LLP

(57) ABSTRACT

A system platform includes a gas turbine engine coupled to a generator. The generator, driven by the gas turbine engine, supplies power to subsystems of the platform.

5 Claims, 3 Drawing Sheets

(56) References Cited

U.S. PATENT DOCUMENTS

| | | | |
|---|---|---|---|
| 6,914,344 B2 | 7/2005 | Franchet et al. | |
| 7,484,354 B2 | 2/2009 | Stretton | |
| 7,526,926 B2 | 5/2009 | Rasmussen et al. | |
| 7,926,287 B2 | 4/2011 | Ullyott et al. | |
| 8,198,744 B2 | 6/2012 | Kern et al. | |
| 8,424,280 B2 | 4/2013 | Moore et al. | |
| 8,829,702 B1 | 9/2014 | Menheere et al. | |
| 9,121,351 B2 | 9/2015 | Ress, Jr. et al. | |
| 9,273,610 B2 | 3/2016 | Fingleton et al. | |
| 9,657,646 B2 | 5/2017 | Wotzak | |
| 10,208,675 B2* | 2/2019 | Mackin | F02C 7/36 |
| 2005/0132693 A1 | 6/2005 | Macfarlane et al. | |
| 2006/0101804 A1 | 5/2006 | Stretton | |
| 2006/0225431 A1 | 10/2006 | Kupratis | |
| 2006/0260323 A1 | 11/2006 | Moulebhar | |
| 2007/0035137 A1 | 2/2007 | Matsukuma et al. | |
| 2007/0137219 A1 | 6/2007 | Linet et al. | |
| 2007/0151258 A1* | 7/2007 | Gaines | F02C 7/36 60/792 |
| 2007/0217905 A1 | 9/2007 | Bouiller et al. | |
| 2008/0120980 A1 | 5/2008 | Gemin et al. | |
| 2008/0148881 A1 | 6/2008 | Moniz et al. | |
| 2008/0265580 A1 | 10/2008 | Sharp | |
| 2008/0276620 A1 | 11/2008 | Ullyott et al. | |
| 2009/0007568 A1 | 1/2009 | Eccles et al. | |
| 2009/0175716 A1 | 7/2009 | Vetters | |
| 2009/0288421 A1 | 11/2009 | Zeiner et al. | |
| 2009/0290976 A1 | 11/2009 | Suciu et al. | |
| 2009/0309423 A1 | 12/2009 | Utsumi | |
| 2011/0088803 A1 | 4/2011 | Geskin et al. | |
| 2011/0154805 A1 | 6/2011 | Heathco et al. | |
| 2012/0025676 A1 | 2/2012 | Poisson | |
| 2012/0072091 A1* | 3/2012 | Muramatsu | G01K 13/02 701/100 |
| 2012/0133150 A1 | 5/2012 | Dooley et al. | |
| 2013/0098060 A1* | 4/2013 | Suciu | F02C 7/32 60/783 |
| 2013/0296092 A1 | 11/2013 | Beckner et al. | |
| 2014/0150401 A1 | 6/2014 | Venter | |
| 2014/0179140 A1 | 6/2014 | Scott et al. | |
| 2014/0224063 A1 | 8/2014 | Alford et al. | |
| 2014/0250902 A1 | 9/2014 | Kraft | |
| 2014/0263820 A1 | 9/2014 | Smith et al. | |
| 2014/0271117 A1 | 9/2014 | Armstrong et al. | |
| 2014/0274420 A1 | 9/2014 | Blewett et al. | |
| 2014/0325992 A1 | 11/2014 | Summerfield | |
| 2014/0338352 A1* | 11/2014 | Edwards | F02C 3/113 60/774 |
| 2014/0356135 A1 | 12/2014 | French et al. | |
| 2014/0367970 A1 | 12/2014 | Van Der Ham et al. | |
| 2015/0295479 A1 | 10/2015 | Chitsaz et al. | |
| 2015/0345385 A1 | 12/2015 | Santini | |
| 2016/0047319 A1 | 2/2016 | Gieras et al. | |
| 2016/0053690 A1 | 2/2016 | Perkinson et al. | |
| 2016/0069458 A1 | 3/2016 | Patino Crespo et al. | |
| 2016/0097328 A1* | 4/2016 | Wintgens | F02C 7/32 415/1 |
| 2016/0305329 A1* | 10/2016 | Saito | F01D 21/003 |
| 2016/0319837 A1 | 11/2016 | Morris et al. | |
| 2016/0332740 A1 | 11/2016 | Eisenhauer et al. | |
| 2017/0225794 A1* | 8/2017 | Waltner | F01D 15/12 |
| 2017/0226934 A1* | 8/2017 | Robic | F02K 3/06 |
| 2017/0260872 A1* | 9/2017 | Munevar | F01D 21/006 |
| 2017/0297727 A1 | 10/2017 | Niergarth et al. | |
| 2018/0002025 A1* | 1/2018 | Lents | B64D 27/10 |
| 2018/0009536 A1* | 1/2018 | Christopherson | B64D 13/06 |
| 2018/0016989 A1 | 1/2018 | Abe et al. | |
| 2018/0058336 A1* | 3/2018 | Munevar | H02K 7/1823 |
| 2018/0354632 A1* | 12/2018 | Hon | B64D 27/24 |

FOREIGN PATENT DOCUMENTS

| | | |
|---|---|---|
| EP | 798454 A2 | 10/1997 |
| EP | 1990519 A2 | 11/2008 |
| EP | 2194290 A2 | 6/2010 |
| EP | 2226487 A2 | 9/2010 |
| EP | 2412939 A1 | 2/2012 |
| EP | 2549628 A2 | 1/2013 |
| EP | 2800210 A2 | 11/2014 |
| EP | 2887536 A1 | 6/2015 |
| EP | 2889452 A1 | 7/2015 |
| GB | 1127659 A | 9/1968 |
| GB | 2444838 A | 6/2008 |
| WO | 1995002120 A1 | 1/1995 |
| WO | 2014143218 A1 | 9/2014 |
| WO | 2016020618 A1 | 2/2016 |

OTHER PUBLICATIONS

European Office Action, dated Mar. 13, 2019 in connection with European Application No. 17170029.7, 6 pages.
European Office Action, dated Oct. 13, 2017 in connection with European Application No. 17170029.7, 10 pages.
European Office Action, dated Mar. 20, 2019 in connection with European Application No. 117170032.1, 7 pages.
European Office Action, dated Oct. 17, 2017 in connection with European Application No. 117170032.1, 9 pages.
Mar-Dustrial Sales, Inc., "Shaft Misalignment 101: Radial, Angular and Axial", Jul. 25, 2011, https://www.mardustrial.com/blog/falk-couplings-and-shaft-misalignment-101-radial-angular-and-axial-07-25-2011 / (Year: 2011).
European Office Action, dated Oct. 13, 2017 in connection with European Application No. 17170031.3, 9 pages.
Extended European Search Report, dated Oct. 17, 2017 in connection with European Application No. 17170030.5, 9 pages.
European Office Action, dated Mar. 12, 2020 in connection with European Application No. 17170030.5, 4 pages.

* cited by examiner

AIRCRAFT HAVING A GAS TURBINE GENERATOR WITH POWER ASSIST

FIELD OF THE DISCLOSURE

The present disclosure relates generally to aircraft having gas turbine engines used for power generation.

BACKGROUND

Aircraft are used in a number of different applications and environments. Many aircraft include an array of sensors, communications links, and other subsystems requiring electrical power. Some aircraft include a gas turbine engine used as a generator to power the electrical subsystems.

Gas turbine engines typically include a compressor, a combustor, and a turbine. The compressor compresses air drawn into the engine and delivers high pressure air to the combustor. In the combustor, fuel is mixed with the high pressure air and is ignited. Exhaust products of the combustion reaction in the combustor are directed into the turbine where work is extracted to drive the compressor and, sometimes, an output shaft, fan, or propeller.

An engine's performance may be limited by power take off requirements and/or environmental conditions around the engine. In aircraft, this can affect flight characteristics and overall capability.

SUMMARY

The present disclosure may comprise one or more of the following features and combinations thereof.

According to an aspect of the present disclosure, a system platform for an aircraft may include a gas turbine engine, a generator, an energy storage unit, and a control system. The gas turbine engine may include a compressor, a combustor, and a turbine. The combustor may be adapted to combine air received from the compressor with fuel and to burn the fuel to supply high pressure gasses toward the turbine to rotate an output shaft of the gas turbine engine. The generator may be coupled to the output shaft of the gas turbine engine and may be adapted to generate electricity when driven by the gas turbine engine. The energy storage unit may be coupled to the generator and may be configured to store the electricity generated by the generator.

In illustrative embodiments, the control system may be configured to selectively operate a starter of the gas turbine engine during flight in an aircraft to apply mechanical energy to the gas turbine engine such that a mass flow through the gas turbine engine is increased without increasing a fuel flow rate to the combustor.

In illustrative embodiments, a high pressure shaft may be concentric with and independently rotatable relative to the output shaft. The turbine may include a high pressure turbine rotor coupled to the compressor and the high pressure shaft and a low pressure turbine rotor coupled to the output shaft.

In illustrative embodiments, the starter may be coupled to the energy storage unit and may be configured to draw electricity from the energy storage unit.

In illustrative embodiments, the starter may be coupled to an accessory gearbox. The accessory gearbox may be configured to transfer mechanical energy from the starter to the high pressure shaft.

In illustrative embodiments, the starter may be selectively operated when a surge margin of the gas turbine engine is below a threshold level.

In illustrative embodiments, a gearbox may be coupled to the output shaft and the generator. The gearbox may be configured to transfer rotation of the output shaft to the generator.

In illustrative embodiments, a fan may be coupled to the gearbox, wherein the gearbox is configured to transfer rotation of the output shaft to the fan.

According to another aspect of the present disclosure, a method of operating a system platform used in an aircraft may include rotating a generator with a gas turbine engine to produce electricity, storing the electricity produced by the generator in an energy storage unit, and selectively applying mechanical energy to the gas turbine engine using electricity from the energy storage unit during flight of the aircraft such that a mass flow through the gas turbine engine is increased without increasing a fuel flow rate to the combustor.

In illustrative embodiments, the gas turbine engine may include a compressor, a combustor, and a turbine. The combustor may be adapted to combine air received from the compressor with fuel and to burn the fuel to supply high pressure gasses toward the turbine to rotate an output shaft of the gas turbine engine.

In illustrative embodiments, the method may further include determining a surge margin of the gas turbine engine.

In illustrative embodiments, mechanical energy may be selectively applied to the gas turbine engine when a surge margin of the gas turbine engine is below a threshold level.

In illustrative embodiments, the gas turbine engine may further include a high pressure shaft concentric with and independently rotatable relative to the output shaft. The turbine may include a high pressure turbine rotor coupled to the compressor and the high pressure shaft and a low pressure turbine rotor coupled to the output shaft.

In illustrative embodiments, a gearbox may be coupled to the output shaft and the generator and may be configured to transfer rotation of the output shaft to the generator.

In illustrative embodiments, a fan may be coupled to the gearbox. The gearbox may be configured to transfer rotation of the output shaft to the fan.

In illustrative embodiments, selectively applying mechanical energy to the gas turbine engine may include selectively operating a starter of the gas turbine engine to transfer mechanical energy from the starter to the high pressure shaft.

In illustrative embodiments, the starter may be coupled to the energy storage unit and may be configured to draw electricity from the energy storage unit.

In illustrative embodiments, the starter may be coupled to an accessory gearbox. The accessory gearbox may be configured to transfer mechanical energy from the starter to the high pressure shaft.

According to another aspect of the present disclosure, an aircraft may include an airframe adapted for flight, and a system platform coupled to the airframe. The system platform may include a gas turbine engine, a generator, an energy storage unit, and a control system. The gas turbine engine may include a compressor, a combustor, and a turbine. The combustor may be adapted to combine air received from the compressor with fuel and to burn the fuel to supply high pressure gasses toward the turbine to rotate an output shaft of the gas turbine engine. The generator may be coupled to the output shaft of the gas turbine engine and may be adapted to generate electricity when driven by the gas turbine engine. The energy storage unit may be coupled to the generator and may be configured to store the electricity generated by the generator.

In illustrative embodiments, the system platform may further include a fan and a gearbox. The fan may be coupled to the output shaft and may be configured to provide thrust when driven by the gas turbine engine to propel the airframe. The gearbox may be coupled to the output shaft, the generator, and the fan. The gearbox may be configured to transfer rotation of the output shaft to the generator and the fan.

In illustrative embodiments, the control system may be configured to selectively operate a starter of the gas turbine engine to apply mechanical energy to the gas turbine engine during flight such that a mass flow through the gas turbine engine is increased without increasing a fuel flow rate to the combustor.

In illustrative embodiments, a high pressure shaft may be concentric with and independently rotatable relative to the output shaft. The turbine may include a high pressure turbine rotor coupled to the compressor and the high pressure shaft and a low pressure turbine rotor coupled to the output shaft.

In illustrative embodiments, the starter may be coupled to an accessory gearbox. The accessory gearbox may be configured to transfer mechanical energy from the starter to the high pressure shaft. The starter may be coupled to the energy storage unit and may be configured to draw electricity from the energy storage unit.

In illustrative embodiments, the starter may be selectively operated when a surge margin of the gas turbine engine is below a threshold level.

These and other features of the present disclosure will become more apparent from the following description of the illustrative embodiments.

DETAILED DESCRIPTION OF THE DRAWINGS

Figure 1:
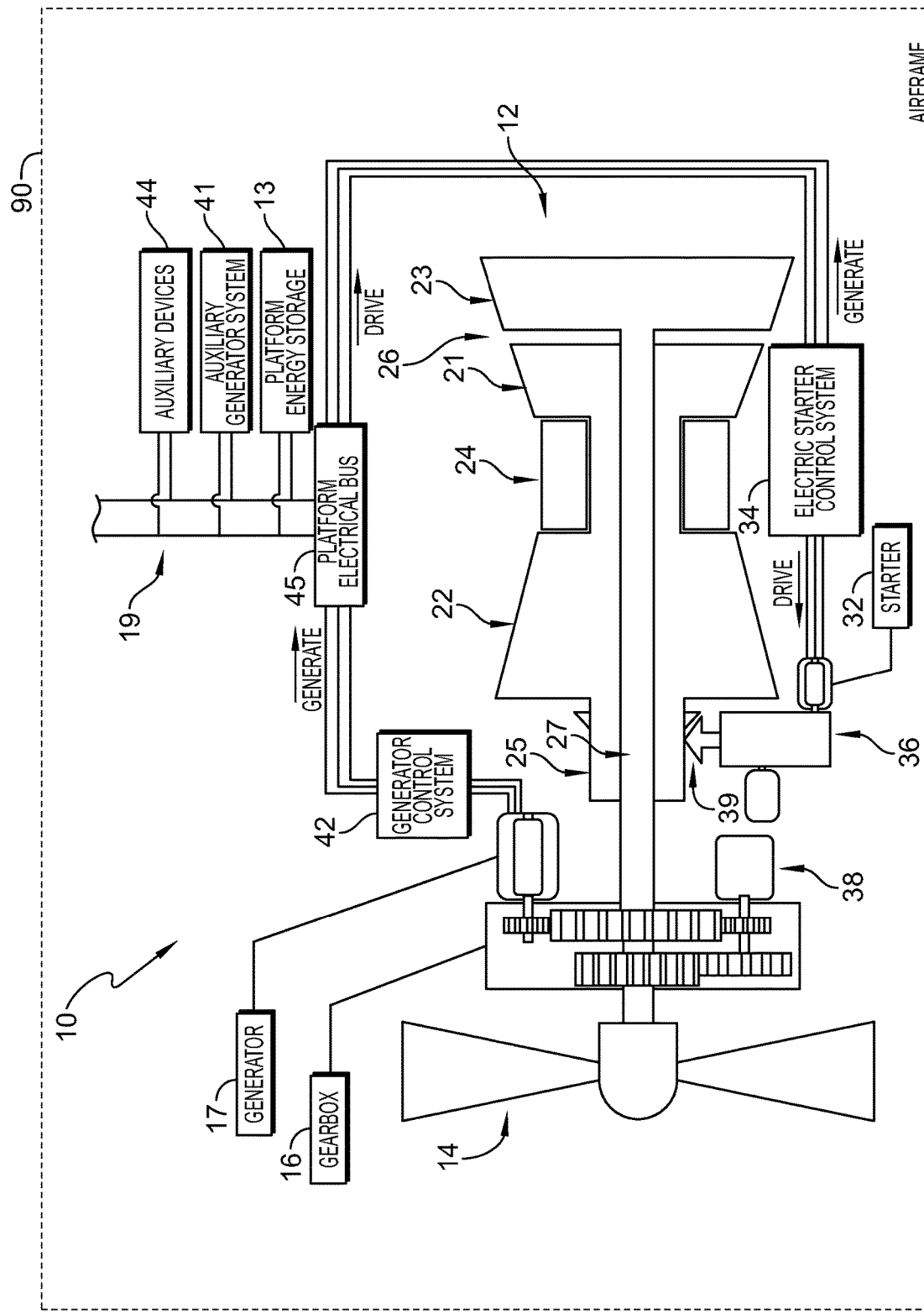
FIG. 1 is a is a diagrammatic view of a system platform included in an aircraft and having a gas turbine engine used to drive a generator for producing power to be stored for later use and suggesting that a starter of the engine can be operated to supplement output of the engine.

For the purposes of promoting an understanding of the principles of the disclosure, reference will now be made to a number of illustrative embodiments illustrated in the drawings and specific language will be used to describe the same.

An energy production system platform 10 with a gas turbine engine 12 is shown, partially diagrammatically, in FIG. 1. The system platform 10 can be integrated into an airframe 90 as part of an aircraft, such as an unmanned aerial vehicle (UAV). The platform 10 generates electricity for storage in an energy storage unit 13. The stored energy can be converted into mechanical energy and supplied to the engine 12 to supplement the output of the engine 12 when the surrounding environmental conditions would otherwise limit performance of the engine 12. For example, the stored energy may be supplied to the engine 12 when operating at a high altitude to prevent engine surge stall.

As shown in FIG. 1, the illustrative system platform 10 includes the gas turbine engine 12 coupled to a prop or fan 14 by a gearbox 16. The platform 10 can be integrated into an airframe 90 and the fan 14 supplies propulsion for the airframe 90 over land and during flight. A generator 17 is also coupled to the gearbox 16 to provide power for auxiliary subsystems 19 of the platform 10 and associated airframe 90. The gas turbine engine 12 drives the gearbox 16 to turn the generator 17 to produce electricity for the platform 10. The produced electricity can be stored in a platform energy storage unit 13 for later use.

The gas turbine engine 12 includes a compressor 22, a combustor 24, and a turbine 26 having a high pressure (HP) turbine rotor 21 and a low pressure (LP) turbine rotor 23 as shown in FIG. 1. Air is drawn into the compressor 22 which compresses and delivers the air to the combustor 24. The combustor 24 mixes fuel with the compressed air from the compressor 22 and combusts the mixture. The hot, high-pressure exhaust products of the combustion reaction in the combustor 24 are directed into the turbine 26 to cause rotation of the HP and LP turbine rotors 21, 23.

The compressor 22 and HP turbine rotor 21 are connected to a high pressure (HP) shaft 25 and rotate together as suggested in FIG. 1. The LP turbine rotor 23 is coupled to a low pressure (LP) shaft 27 which rotate together. The HP and LP shafts 25, 27 are rotatable independent of one another. The compressor 22, combustor 24, and HP turbine rotor 21 cooperate to run the gas turbine engine 12 while the hot, high-pressure exhaust products from the combustor 24 rotate the LP turbine rotor 23 and LP shaft 27 to drive the fan 14 and generator 17.

A starter 32 of the engine 12 is controlled by an electric starter control system 34 as suggested in FIG. 1. The starter 32 is configured to rotate the HP shaft 25 and start the engine 12 by pre-compressing air for combustion in the combustion chamber 24 during "light-off." In the illustrative embodiment, the starter 32 is coupled to an accessory gearbox 36 which engages with the HP shaft 25 through a bevel gear 39. One or more additional engine accessories 38 can be connected to the accessory gearbox 36, such as oil pumps for example, to run the accessories during starting of the engine 12 and while the engine 12 is running. One or more additional engine accessories 38 can also be connected to the gearbox 16.

Figure 3:
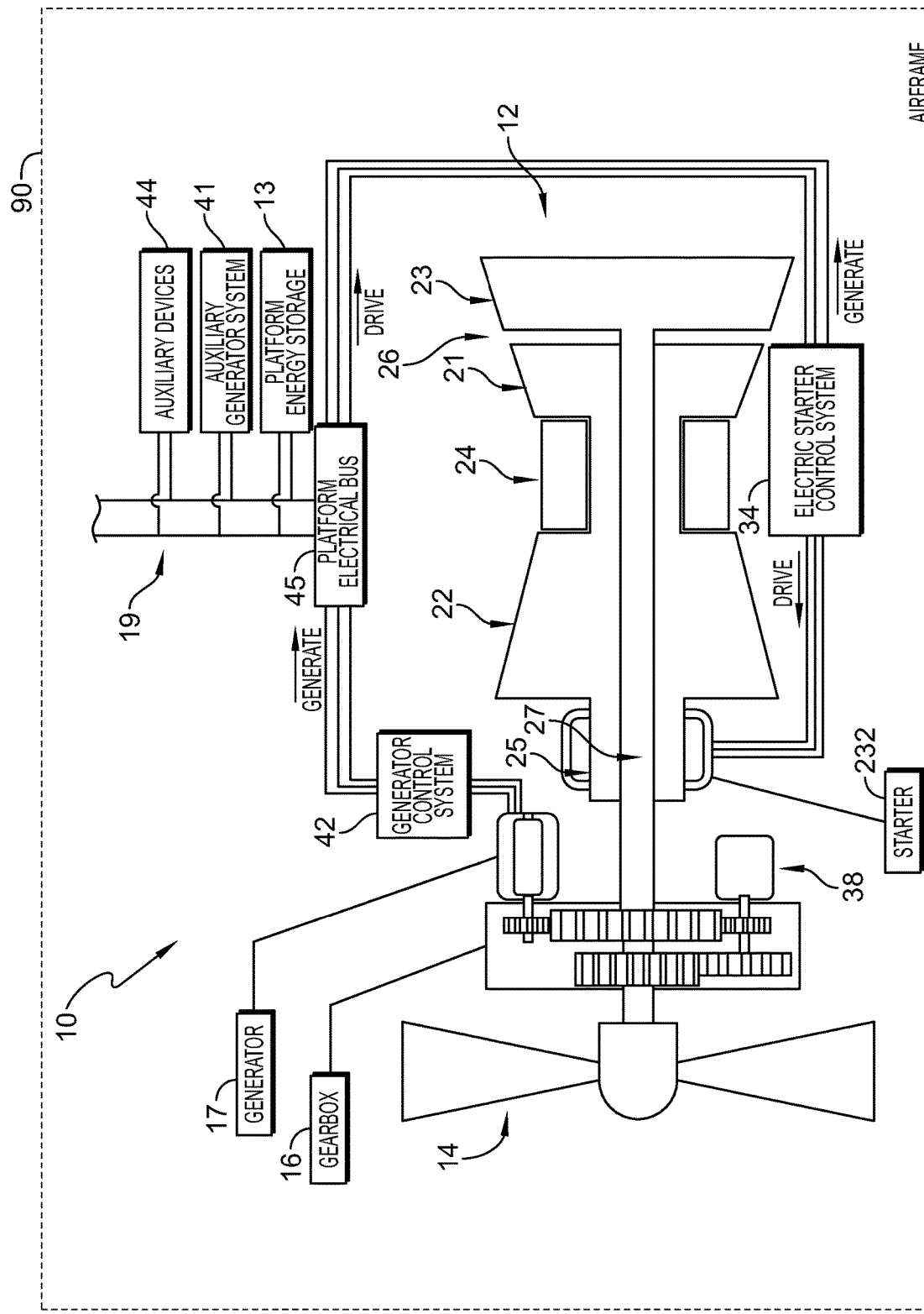
FIG. 3 is a view similar to FIG. 1 showing a starter of the engine integrated with a shaft of the engine.

In some embodiments, a starter 232 is integrated with the HP shaft 25 as suggested in FIG. 3. The starter 232 is used to start the engine 12 and acts as a generator while the engine 12 is running similar to the starter 32 of FIG. 1. In some embodiments, rotor components of the starter 232, such as magnets or rotor windings, are integrated with the HP shaft 25.

A generator control system 42 is used to monitor the platform energy storage unit 13 and other auxiliary subsystems 19 of the platform 10 as suggested in FIG. 1. In the illustrative embodiment, a platform electrical bus 45 connects auxiliary devices 44 of the platform 10, such as sensors and communication devices, with the platform energy storage unit 13 to supply energy for the auxiliary devices 44. Starter 32 is driven by engine 12 to supply energy to various components of the engine 12. Alternatively or in combination with the starter 32, the generator 17 can supply energy to the engine 12 components.

In some embodiments, an auxiliary generator system 51, such as an internal combustion engine powered generator or another gas turbine engine powered generator, is used to maintain a threshold level of power in the platform energy storage unit 13 as suggested in FIG. 1. In some embodiments, the platform 10 is designed to be a self-sustaining unit which can operate independent of other external power source so long as fuel is supplied to the engine 12. The generator control system 42 monitors the amount of energy stored in platform energy storage unit 13 and controls operation of the auxiliary generator system 41 if the amount of stored energy drops below a threshold level.

Starter 32 is also coupled to platform energy storage unit 13 as suggested in FIG. 1. Starter 32 can draw electrical power from platform energy storage unit 13 to add mechanical energy into engine 12, such as during starting of the engine 12. In some embodiments, starter 32 can add mechanical energy into engine 12 during take-off or rapid climbing of the airframe 90 carrying the platform 10. The added mechanical energy can supplement the output of the engine 12 when the surrounding environmental conditions would otherwise limit performance of the engine 12.

Figure 2:
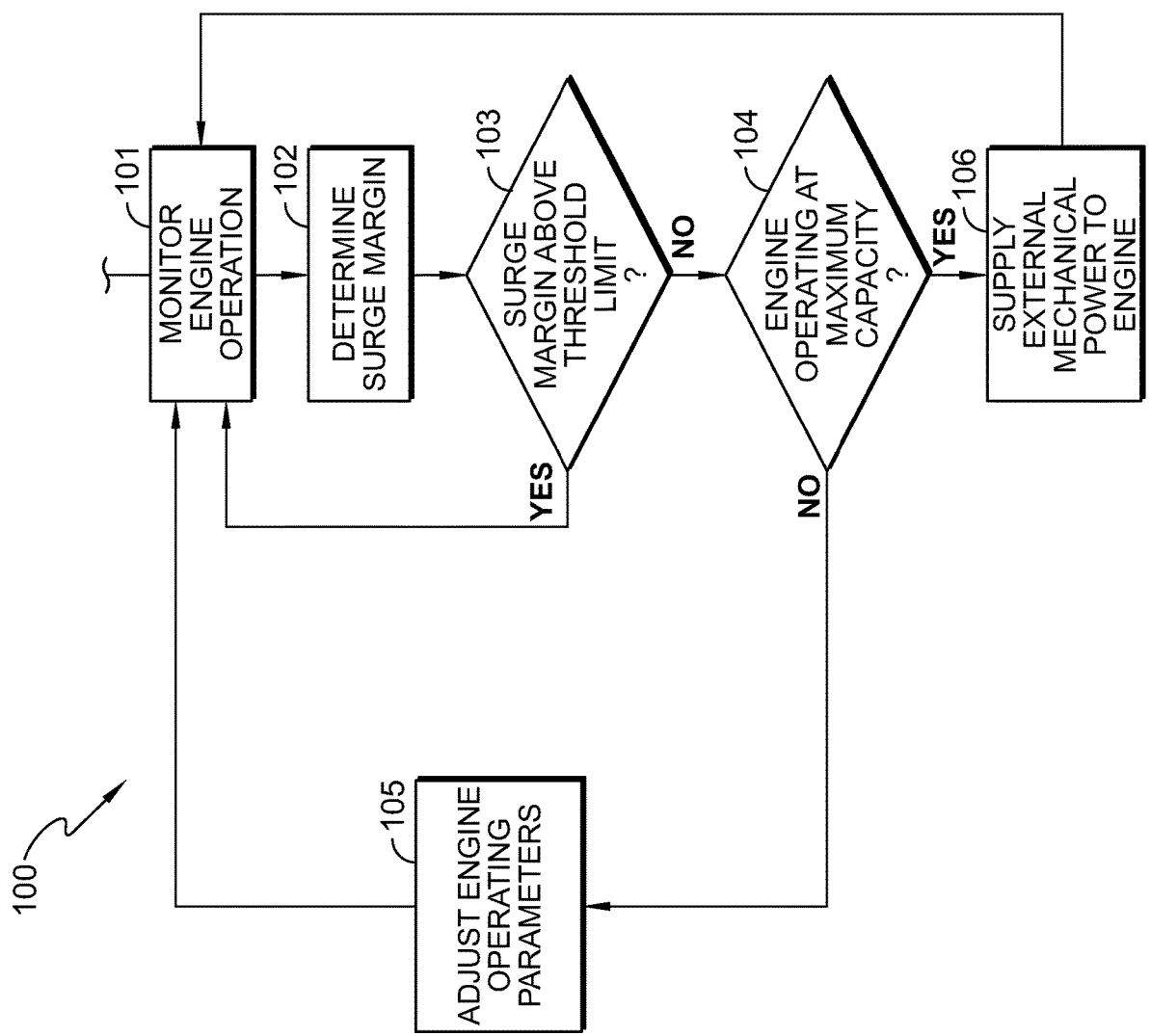
FIG. 2 is a diagrammatic view of a process for operating the gas turbine engine of FIG. 1 showing that engine performance is monitored and is adjusted based on operating parameters.

An illustrative process 100 for operating the platform 10 in accordance with the present disclosure is shown in FIG. 2. The process starts at 101, where performance of the engine 12 is monitored. A surge margin (i.e., gap between current engine parameters and stall parameters) of the engine 12 is determined at 102. In some embodiments, the surge margin is based on detected pressures in the compressor 22 and turbine 26, determined mass flow through the engine 12, and environmental conditions such as ambient temperature, humidity, and oxygen levels, for example. If the surge margin is above a threshold limit, monitoring of the engine 12 continues as suggested at 103.

If the determined surge margin is below a threshold limit, a check of the operating parameters of the engine 12 is conducted as suggested at 104 in FIG. 2. If the engine 12 is not operating at its maximum capacity for the detected conditions, operating parameters of the engine 12 are adjusted at 105 to increase the surge margin above the threshold limit. In some embodiments, blades of the compressor 22 can be adjusted to increase mass flow through the compressor 22 to match with that of the turbine 26. In some embodiments, pressure relief vents included in the compressor 22, turbine 26, or both can be adjusted to adjust for pressure differentials across the engine 12.

If parameters of the engine 12 cannot be adjusted to increase output and raise the surge margin of the engine 12, external mechanical power is supplied to the engine 12 as suggested at 106 in FIG. 2. In some embodiments, the starter 32 provides power to the HP shaft 25 to increase pressure and mass flow through the compressor 22 without increasing a flow rate of the fuel being supplied to the combustor 24. The added pressure and mass flow through the compressor 22 can increase the surge margin of the engine 12. The airframe 90 carrying the platform 10 can climb faster, for example, than with the engine 12 alone.

In gas turbine engines (such as engine 12), mechanical power is transferred from turbines (such as turbine 26) to compressors (such as compressor 22) through shaft and spline systems (such as HP and LP shafts 25, 27), with bearings providing axial and radial positioning of the rotating components. A central shaft (which may be referred to as a "main" shaft, a "main drive," or a "mainline" shaft, for example) typically links the turbine 26 and compressor sections 22 of the turbine engine 12. In turbine engines 12 having multiple turbine 21, 23 and compressor sections 22, there may be multiple, concentric, independently rotatable shafts 25, 27. For example, a high pressure (HP) shaft 25 may link a high pressure compressor 22 with a high pressure turbine 21, while a low pressure (LP) shaft 27 links a fan 14 or other mechanical output, such as a "main" generator, with a low pressure turbine 23. The low pressure shaft 27 may be concentric with and disposed within the high pressure shaft 25.

During operation, the gas turbine engine 12 drives a generator 17 to supply power for accessories and subsystems 19 of the associated platform 10. Typical engine accessories (i.e., 38) include an engine control unit (i.e., 34), a starter 32, fuel pumps, oil pumps, etc. In order to extract power from the turbine engine 12 to drive these accessories and subsystems, one or more mechanical or electrical "accessory" drives (i.e., 36) transmit power from the mainline shafts (i.e., 25) to a starter 32 of the engine 12. The starter 32 is used to turn the engine 12 when activated, such as when starting the engine 12, and generate power when idle. For example, a bevel gear 39, alone or in combination with other components (such as a stub shaft, idler, spur gears and splines), may be driven by a mainline shaft (i.e., 25). The bevel gear 39 may drive an accessory gearbox 36, which in turn rotates the starter 32 to provide power to the engine accessories 38.

The system platform 10 is generally a self-contained unit which can operate without input from external power sources if needed. In some embodiments, the platform 10 is a mobile unit which can be integrated into an air, land, or water based vehicle, for example.

In illustrative embodiments, the system platform 10 of the present disclosure can be part of an unmanned aerial vehicle (UAV). The UAV generally includes an array of sensors, communications links, and other subsystems requiring electrical power. The UAV platform includes a gas turbine engine 12 used as a generator 17 and an energy storage unit 13 used to store electricity produced by the generator 17.

The gas turbine engine 12 can also be used to drive a prop or fan 14 of the UAV to propel the UAV over land and during flight. In some embodiments, the UAV is used for high-altitude, long-endurance flight to provide various functions such as communications relay, environmental monitoring, and assisted targeting, among others. Rapid deployment of UAVs for these operations can be critical, and performance of the gas turbine engine 12 is an essential part of the UAV's ability to reach high altitude in a reduced timeframe.

In illustrative embodiments of the present disclosure, the gas turbine engine 12 is supplied with an external source of mechanical power, such as through the starter 32, to supplement engine performance. During rapid acceleration and high altitude flight, engine performance can be compromised due to an increased pressure differential across the engine 12 or loss of usable airflow, to name a few. These negative effects can be minimized by adding mechanical power into the engine 12 from an external source. The engine 12 can then operate above a maximum capacity for the surrounding environmental conditions and allow the UAV to be quickly and efficiently deployed.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A system platform for an aircraft, the system platform comprising a gas turbine engine including a compressor, a combustor, a turbine, a high pressure shaft concentric with and independently rotatable relative to an output shaft, wherein the turbine includes a high pressure turbine rotor coupled to the compressor and the high pressure shaft, and a low pressure turbine rotor coupled to the output shaft, the combustor adapted to combine air received from the compressor with fuel and to burn the fuel to supply high pressure gasses toward the turbine to rotate the output shaft of the gas turbine engine, a gearbox coupled with the output shaft to rotate with the output shaft, a fan coupled with the gearbox and powered by the gearbox to provide thrust to propel the aircraft, a generator coupled to the gearbox and adapted to generate electricity when driven by the gearbox, an energy storage unit coupled to the generator and configured to store the electricity generated by the generator and distribute the electricity to auxiliary devices of the aircraft, a generator control system configured to monitor the amount of electricity in the energy storage unit and control an auxiliary generator system if the amount of electricity in the energy storage unit drops below an electricity threshold level, a starter coupled with the high pressure shaft via an accessory gearbox, and a starter control system configured to selectively operate the starter in a drive mode during flight in the aircraft to apply mechanical energy to the gas turbine engine such that a mass flow through the gas turbine engine is increased with increasing a fuel flow rate to the combustor, wherein the starter is selectively operated in the drive mode when a surge margin of the gas turbine engine is below a surge margin threshold level, the starter is coupled to the energy storage unit and is configured to draw electricity from the energy storage unit and is coupled to the accessory gearbox that is configured to transfer mechanical energy from the starter to the high pressure shaft, the starter control system configured to selectively operate the starter in a generation mode to generate electrical power from rotational drive of the high pressure shaft and to supply the electrical power to engine accessories, wherein the engine accessories include a fuel pump and an oil pump.

2. A method of operating a system platform used in an aircraft, the method comprising rotating a generator with a gearbox to produce electricity, the gearbox connected to a gas turbine engine including a compressor, a combustor, and a turbine, the combustor adapted to combine air received from the compressor with fuel and to burn the fuel to supply high pressure gasses toward the turbine to rotate an output shaft of the gas turbine engine, the output shaft transferring rotation to the gearbox, storing the electricity produced by the generator in an energy storage unit, distributing the electricity stored in the energy storage unit to auxiliary devices and a starter, selectively operating the starter to generate electrical power from rotational drive of a high pressure of the gas turbine engine to supply electrical power to the energy storage unit, selectively applying mechanical energy to the gas turbine engine using electricity from the energy storage unit during flight of the aircraft such that a mass flow through the gas turbine engine is increased without increasing a fuel flow rate to the combustor, wherein selectively applying mechanical energy to the gas turbine engine includes selectively operating the starter of the gas turbine engine to transfer mechanical energy from the starter to the high pressure shaft, wherein the starter is coupled with the energy storage unit and is configured to draw electricity from the energy storage unit, and the starter is coupled to an accessory gearbox that is configured to transfer mechanical energy from the starter to the high pressure shaft, and determining a surge margin of the gas turbine engine, propelling the aircraft with thrust provided by a fan, the fan coupled to the gearbox to be powered by with the gearbox.

3. The method of claim 2, wherein mechanical energy is selectively applied to the gas turbine engine when the surge margin of the gas turbine engine is below surge margin threshold level.

4. The method of claim 2, wherein the gas turbine engine includes the high pressure shaft concentric with and independently rotatable relative to the output shaft, and wherein the turbine includes a high pressure turbine rotor coupled to the compressor and the high pressure shaft, and a low pressure turbine rotor coupled to the output shaft.

5. An aircraft comprising an airframe adapted for flight, and a system platform coupled to the airframe and comprising:

a gas turbine engine including a compressor, a combustor, a turbine, and a high pressure shaft concentric with and independently rotatable relative to an output shaft, wherein the turbine includes a high pressure turbine rotor coupled to the compressor and the high pressure shaft, and a low pressure turbine rotor coupled to the output shaft, the combustor adapted to combine air received from the compressor with fuel and to burn the fuel to supply high pressure gasses toward the turbine to rotate the output shaft of the gas turbine engine, a gearbox coupled to the output shaft and driven by the output shaft, the gearbox configured to transfer rotation of the output shaft to a generator, wherein the generator is adapted to generate electricity when driven by the gas turbine engine, an energy storage unit coupled to the generator and configured to store the electricity generated by the generator, a fan coupled to the gearbox and configured to provide thrust when driven by the gearbox to propel the airframe, a starter for selectively applying mechanical force of rotation to the high pressure shaft, and a control system configured to selectively operate the starter of the gas turbine engine to apply mechanical energy to the gas turbine engine during flight such that a mass flow through the gas turbine engine is increased without increasing a fuel flow rate to the combustor in a drive mode, wherein the starter is selectively operated in the drive mode when a surge margin of the gas turbine engine is below a threshold level, wherein the starter is coupled to an accessory gearbox, wherein the accessory gearbox is configured to transfer mechanical energy from the starter to the high pressure shaft, and wherein the starter is coupled to the energy storage unit and is configured to draw electricity from the energy storage unit in the drive mode, the control system configured to selectively operate the starter in a generation mode to generate electrical power from rotational force of the high pressure shaft.

* * * * *